(12) United States Patent
Georgis

(10) Patent No.: US 8,127,068 B2
(45) Date of Patent: Feb. 28, 2012

(54) REMOVABLE CARTRIDGE STORAGE DEVICES AND METHODS

(75) Inventor: Steven P. Georgis, Boulder, CO (US)

(73) Assignee: Tandberg Data Holdings S.A.R.L., Luxembourg (LU)

(*) Notice: Subject to any disclaimer, the term of this patent is extended or adjusted under 35 U.S.C. 154(b) by 1016 days.

(21) Appl. No.: 11/121,760

(22) Filed: May 3, 2005

(65) Prior Publication Data

US 2006/0007576 A1    Jan. 12, 2006

Related U.S. Application Data

(60) Provisional application No. 60/586,085, filed on Jul. 6, 2004.

(51) Int. Cl.
*G06F 13/36* (2006.01)
(52) U.S. Cl. .................. 710/315; 711/111; 711/115
(58) Field of Classification Search .............. 711/115, 711/111; 710/315
See application file for complete search history.

(56) References Cited

U.S. PATENT DOCUMENTS

| | | | |
|---|---|---|---|
| 6,611,394 B1 | 8/2003 | Kato et al. | |
| 6,618,795 B2 | 9/2003 | Chan et al. | |
| 6,674,596 B1 | 1/2004 | Takayama | |
| 6,717,762 B1 | 4/2004 | Bauck et al. | |
| 6,717,769 B2 | 4/2004 | Staley et al. | |
| 6,813,698 B2 | 11/2004 | Gallo et al. | |
| 6,865,640 B2* | 3/2005 | Dimitri et al. | 711/100 |
| 6,892,275 B2* | 5/2005 | Bolt et al. | 711/114 |
| 6,957,291 B2* | 10/2005 | Moon et al. | 710/302 |
| 2002/0144044 A1 | 10/2002 | Moon et al. | |
| 2003/0149700 A1* | 8/2003 | Bolt | 707/101 |
| 2004/0181388 A1* | 9/2004 | Yip et al. | 703/25 |
| 2005/0033911 A1* | 2/2005 | Kitamura et al. | 711/111 |
| 2005/0188246 A1 | 8/2005 | Emberty et al. | |
| 2005/0193235 A1* | 9/2005 | Sandorfi et al. | 714/6 |
| 2005/0268119 A9 | 12/2005 | Guha et al. | |
| 2006/0010275 A1 | 1/2006 | Moon et al. | |

OTHER PUBLICATIONS

"What Is IVDR?," printout from website http://www.ivdr.org/IVDR/ivdr_e.html, 2 pages, printout date: May 27, 2004.

* cited by examiner

*Primary Examiner* — Mark Rinehart
*Assistant Examiner* — Nimesh G Patel
(74) *Attorney, Agent, or Firm* — Kilpatrick Townsend & Stockton, LLP

(57) ABSTRACT

Removable cartridge storage devices and methods are disclosed. In one embodiment, the removable cartridge storage device comprises a plurality of cartridge holders, each of the cartridge holders including an electrical connector configured to removably couple with a mating electrical connector of a portable data cartridge having an electronic interface, a system controller configured to control data operations, and a switch, coupled between the cartridge holders and the system controller, to electronically switch connections between the system controller and each of the cartridge holders.

24 Claims, 14 Drawing Sheets

REMOVABLE CARTRIDGE STORAGE DEVICES AND METHODS

CROSS-REFERENCE TO RELATED APPLICATIONS

This application claims the benefit of U.S. Provisional Application No. 60/586,085, entitled "Removable Cartridge Disk Device and Methods", filed Jul. 6, 2004, which is incorporated herein by reference.

This application is also related to U.S. patent application Ser. No. 11/122,322, entitled "Data Replication Systems and Methods", filed on May 3, 2005, U.S. Provisional Application No. 60/586,087 entitled "Electronic Storage Cartridge", filed on Jul. 6, 2004 and U.S. Provisional Application No. 60/586,086, entitled "Auto-Replicating System for Removable Data Cartridges", filed on Jul. 6, 2004. The details of these applications are hereby incorporated by reference.

BACKGROUND OF THE INVENTION

The present invention generally relates to data storage devices. More specifically, the present invention relates to removable cartridge storage devices.

Computer backup has traditionally been performed using tape drive technologies. Tape drive technologies have been popular in the use of backup systems for a variety of reasons. One reason is that tape media has generally had the lowest cost per bit of storage. Additionally, tape devices use removable tape cartridges, which may be taken to an off-site location to provide for disaster recovery. A third reason tape devices are popular is because of the long-term archive characteristics of tape media.

As the storage capacity in stand-alone and networked computers has increased, so have the demands on backup systems. One of the current trends is the use of mechanical automation systems, such as tape cartridge autoloaders and robotic tape libraries, to expand the capacity of the backup system. The cartridge autoloaders and tape libraries hold multiple removable tape cartridges. One or more tape drives is embedded inside a storage area containing one or more magazines of tape cartridges. These systems also include a mechanical system to automate the cartridge changing operation. The mechanical system is used to load and unload the cartridges between the magazines and the tape drives.

A prior art standalone tape drive that may be used to perform data backups is illustrated in FIG. 1. The tape drive 100 includes a system controller 102. The system controller 102 includes an interface to a host computer 120. By way of example, the interface to the host computer may be Small Computer Systems Interface (SCSI), Fiber Channel (FC), or other type of communication interface. The system controller 102 also includes a microprocessor which performs data formatting for the tape medium. The tape drive 100 also includes a tape recording mechanism 104 which magnetically encodes the formatted data on magnetic tape cartridges 106, 108, 110. Tape recording mechanism 104 is also used to read data from the magnetic tape cartridges 106, 108, 110. Oftentimes, the backup of host computer may require more storage capacity than that available on a single tape cartridge 106, 108, 110. Thus, if the tape drive is not part of a tape autoloader system, an operator may be required to manually remove a tape cartridge 106 which has reached its data storage capacity, and insert a new tape cartridge 108, so that the transfer of data from host computer to magnetic tape cartridges may continue. The operator may be required to repeat this process multiple times before the backup is completed.

FIG. 2 illustrates a second prior art system that has multiple tape drives 210, 220 coupled to a host computer system 200. Both tape drives 210, 220 include system controllers 212, 222. Each of the system controllers 212, 222 has an interface to host computer system 200, such as a SCSI or FC interface. The tape drives 210, 220 additionally includes a tape recording mechanism 214, 224, which may be used to magnetically encode data on a magnetic tape cartridge 216, 226.

In some embodiments, a tape automation system, such as the tape autoloader 300 illustrated in FIG. 3 may be used to automate cartridge changing operations. The tape autoloader includes at least one tape drive 320. Multiple storage slots 311-317 may be used to house tape cartridges 301-307. In some embodiments, the storage slots 311-317 may be part of a removable magazine to facilitate the loading and unloading of cartridges.

A motorized mechanism 330 may be used to move the tape cartridges 301-307 to and from the tape drive 320. The motorized mechanism may also optionally be used to move cartridges to and from an access opening (not shown) to the tape autoloader 300, which may be used to enter and remove tape cartridges 301-307 into the tape autoloader 300. In one embodiment, the motorized mechanism 300 may include a cartridge picker arm 334 and a picker motor 332 to operate the cartridge picker arm 334. A drive motor 336 is used to drive the motorized mechanism 330.

The tape autoloader 300 has at least two interfaces 352, 354 to host computer 350. By way of example, interfaces 352, 354 may be SCSI or FC interfaces. One interface 354 is provided for each tape drive 320 included in the tape autoloader. This interface 354 may be referred to as the "data path" interface and is used to send data and tape drive commands to a system controller component of tape drive 320. In embodiments in which the tape autoloader 300 includes multiple tape drives, the data path interfaces to each tape drive may be coupled to different host computers. A second interface 352 (also called the "control path") is used to send media changer commands to the autoloader mechanism controller 340, such as load, unload, and audit commands. The autoloader mechanism controller 340 includes electronics and software used to actuate the motorized mechanism 330 for movement of tape cartridges 301-307 and auditing of the tape autoloader 300. In some embodiments, the control path interface 352 may be coupled to a second host computer. The autoloader mechanism controller 340 may also be communicatively coupled to tape drive 320 for communications between these components. Although multiple tape drives in the tape autoloader 300 may be operated in parallel, the mechanical system 330 used to load and unload cartridges can only move a single cartridge at a time. Additionally, each tape drive 320 has its own system controller which requires a separate "data path" interface to a host computer 350.

Another prior art system that may be used to perform backups is illustrated in FIG. 4. FIG. 4 illustrates a virtual tape system 400. The virtual tape system 400 uses a HDD or array of HDDs 404 for storage of data. A system controller 402 may provide emulation of tape interface commands to enable the virtual tape system to interface to a backup software application using a native tape command set. Thus, the system controller 402 may communicate with a host computer 410 over an interface using SCSI or FC tape commands. The system controller 402 also formats received data to a disk format for recordation on HDDs 404. The HDDs may be in a RAID or JBOD configuration and may be logically partitioned to create the illusion of multiple discrete data cartridges to which the data is recorded. However, in this type of system, the virtual data cartridges are not physically separable from one another since they are all contained in a single disk or disk array. Thus, the data cannot be removed to an offsite location for disaster recovery protection.

BRIEF SUMMARY OF THE INVENTION

Removable cartridge storage devices and methods are disclosed. In some embodiments, the removable cartridge storage device comprises a plurality of cartridge holders, a system controller, and a switching component. The cartridge holders each include an electrical connector configured to removably couple with a mating electrical connector of a portable data cartridge having an electronic interface (e.g., data cartridges having embedded hard disk drives or flash memory). In some aspects, the cartridge holders may each define an opening exterior to the removable cartridge storage device to receive portable data cartridges. The system controller be configured to process commands transmitted to the removable cartridge storage device. The switching component may be coupled between the cartridge holders and the system controller, and may be used to electronically switch connections between the system controller and each of the cartridge holders. Thus, the system controller may electrically switch data operations to different data cartridges. Optionally, in some embodiments, the removable cartridge storage device may also comprise a serial advanced technology attachment (SATA) interface, coupled between the system controller and the cartridge holders.

The system controller may include an interface (e.g., SCSI, Fiber Channel interface, etc.) to receive data commands. In some aspects, the interface may also be used to receive media changer commands (e.g., SCSI media changer commands) or a second interface may be included in system controller to receive media changer commands. Thus, the system controller may be configured to execute the media changer commands. Merely by way of example, media changer commands processed by the system controller may include move medium commands (e.g., SCSI Move Medium, SCSI Exchange Medium), audit commands (e.g., SCSI Initialize Element Status, SCSI Read Element Status), system configuration commands, system diagnostic commands, or other types of media changer commands.

In some instances, the system controller may emulate an automated tape device or other tape device. System controller may thus be configured to receive and execute sequential tape device commands and/or automated tape device commands autoloader system. Thus, the system controller may translate received commands from tape commands to the appropriate command for the autoloader device using data cartridges with electronic interfaces.

The system controller may, in some aspects, operate portable data cartridges removably coupled with the cartridge holders independently of the other portable data cartridges. In some aspects, the system controller may be configured to write data to the portable data cartridges sequentially. In other aspects, system controller may be configured to perform copy operations without transferring data to a host computer.

In other embodiments, the removable cartridge storage device comprises a cartridge holder, a system controller, and a cartridge interface communicatively coupled between the system controller and the cartridge holder. The cartridge holder has an electrical connector configured to removably couple with a mating electrical connector of a portable data cartridge having an electronic interface. The system controller is configured to emulate a tape device and to process commands transmitted to the removable cartridge storage device. The cartridge interface provides electronic signaling to a portable data cartridge removably coupled with the cartridge holder.

In other embodiments, a method is disclosed which comprises receiving, at a storage device, a data command (e.g., read, write, copy) from a host computer system. The data command is associated with a first portable data cartridge having an electronic interface. The first portable data cartridge is removably coupled with the storage device. Communications are electronically switched from a second portable data cartridge removably coupled with the storage device to the first portable data cartridge and the data command is executed.

In some aspects, the data command may be a tape command. In other aspects, the data command may comprise a copy command. The copy command may be executed by reading data from the first portable data cartridge and electronically switching to a target portable data cartridge removably coupled with the storage device. The data may be written to the target portable data cartridge without transferring the data to the host computer system.

Further aspects of the method may comprise receiving a move media command and executing the move media command electronically. Alternatively, or additionally, the method may comprise receiving an audit command and auditing the storage device electronically.

A further understanding of the nature and advantages of the present invention may be realized by reference to the remaining portions of the specification and the drawings.

BRIEF DESCRIPTION OF THE DRAWINGS

Illustrative embodiments in accordance with the invention are illustrated in the drawings in which.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Figure 1:
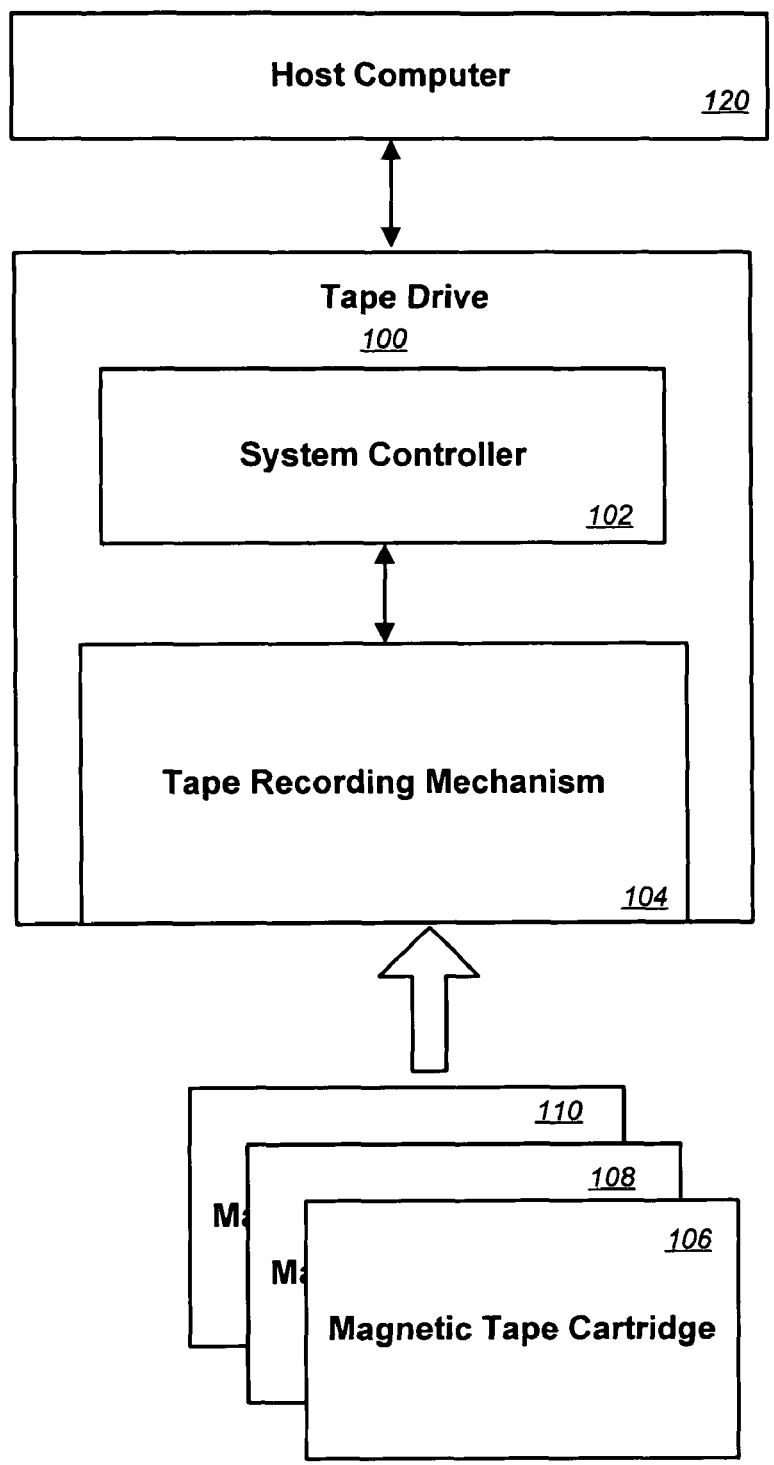
FIG. 1 illustrates a prior art tape drive.
Figure 2:
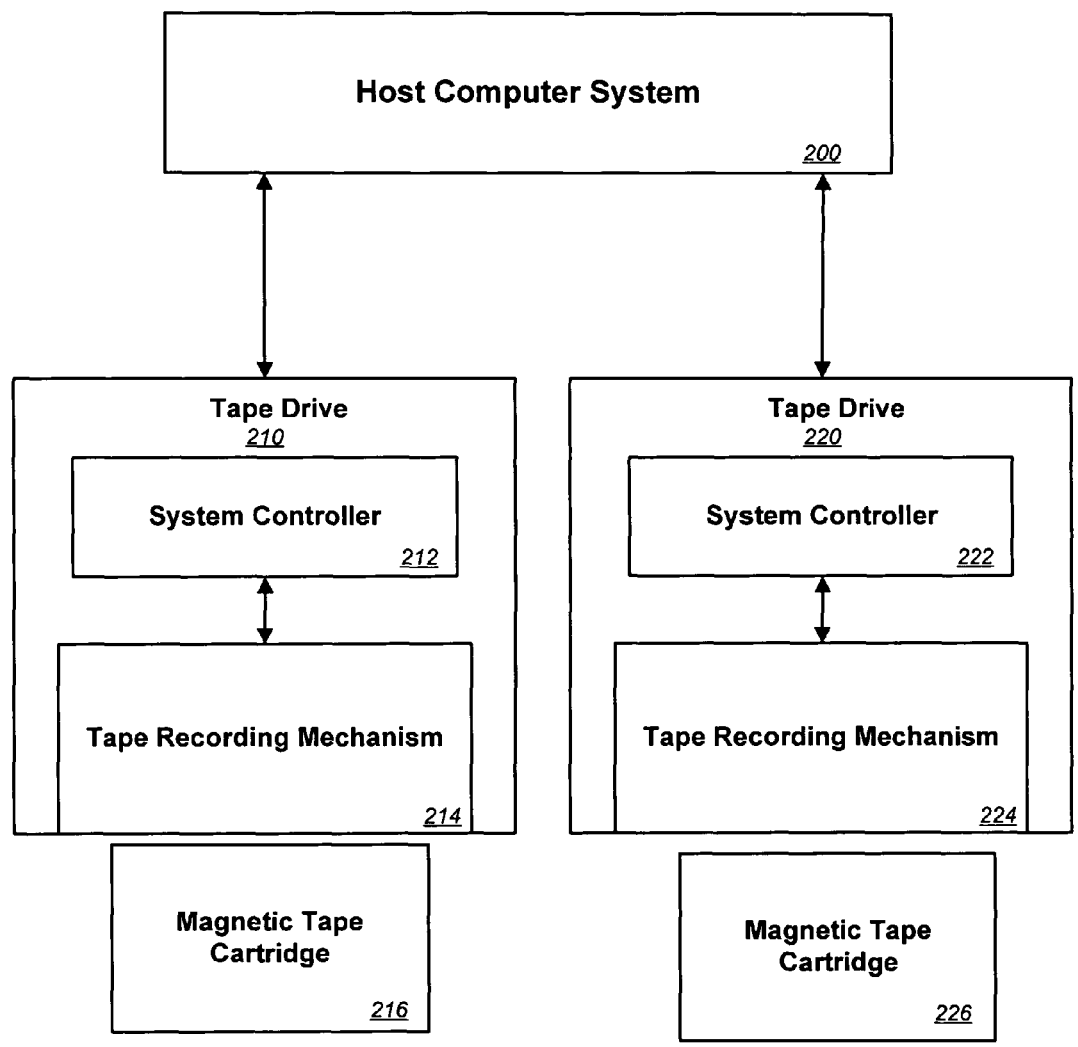
FIG. 2 illustrates a prior art multiple tape drive system.
Figure 3:
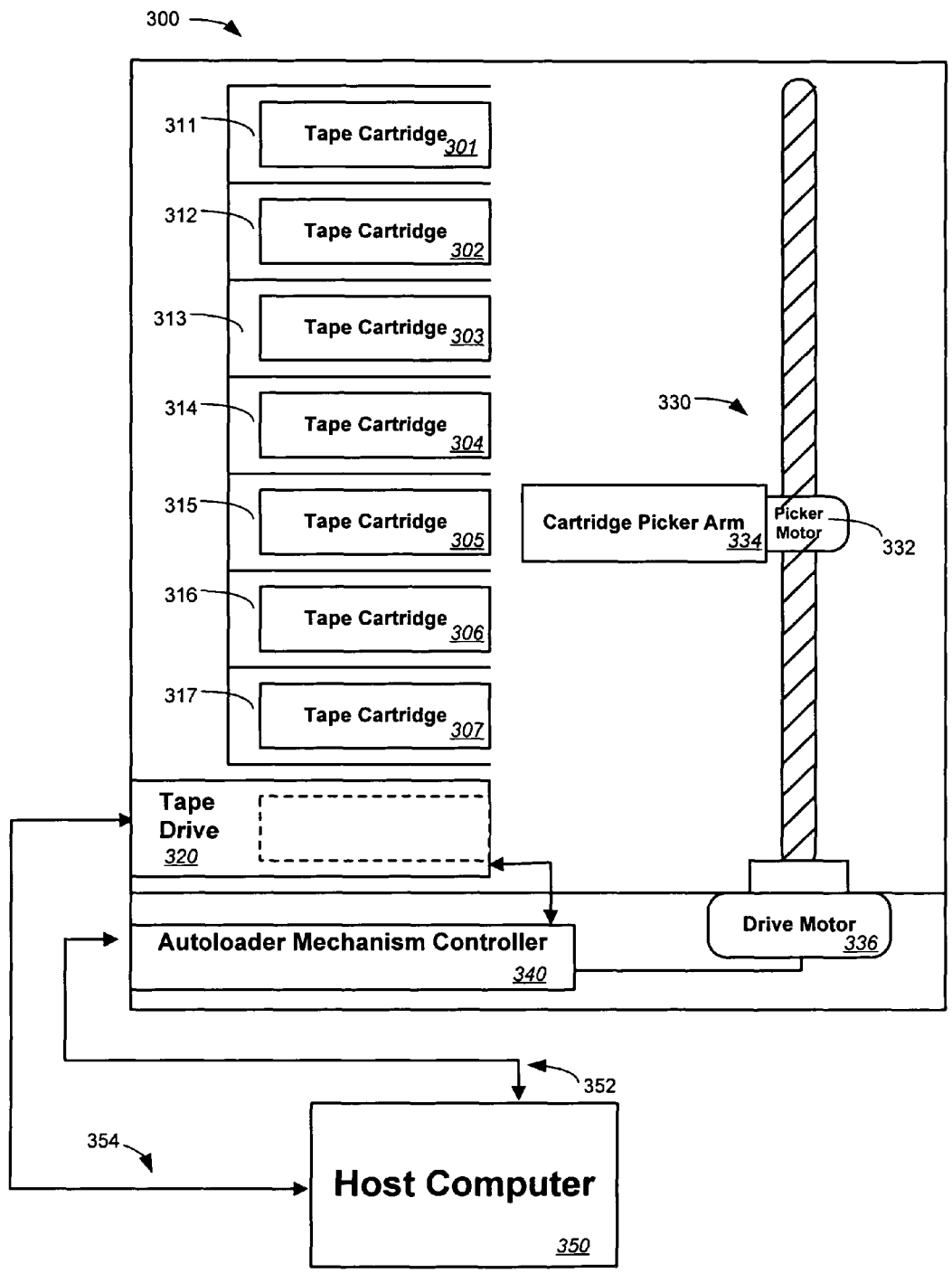
FIG. 3 illustrates a prior art tape autoloader.
Figure 4:
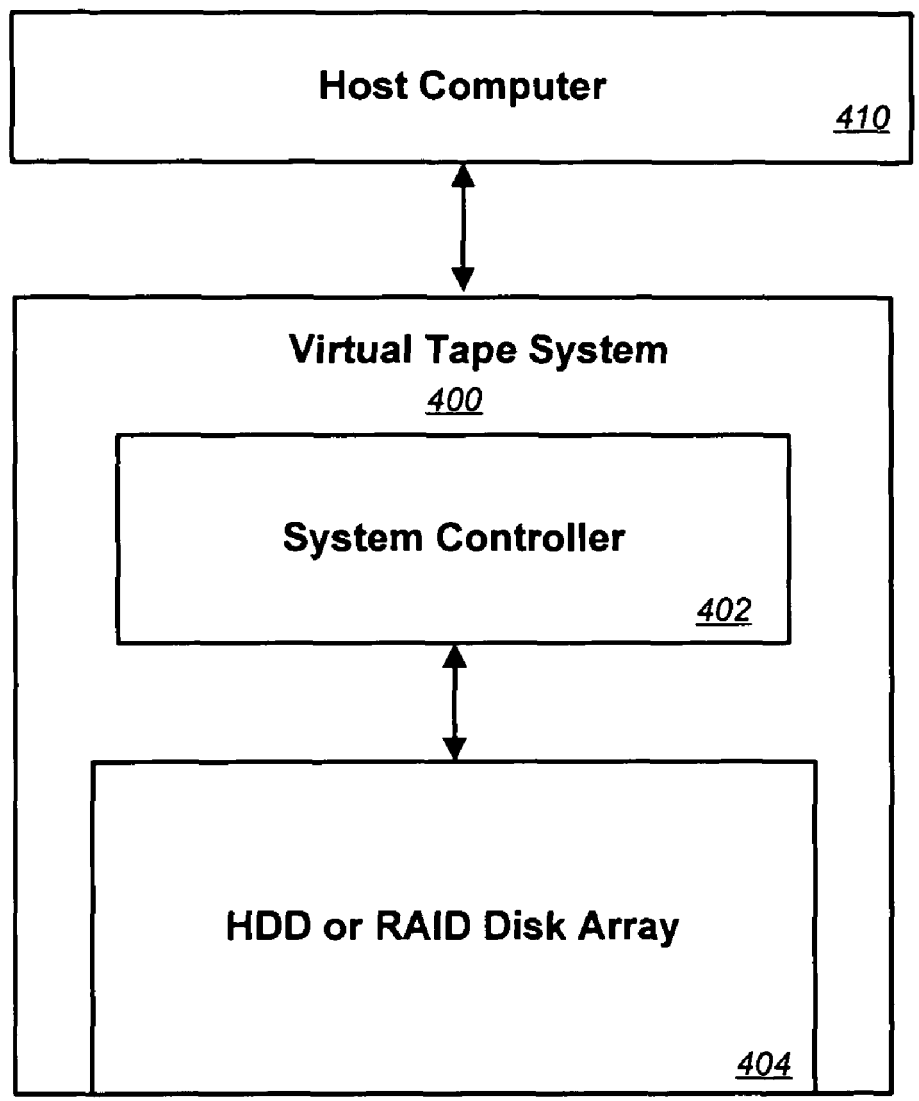
FIG. 4 illustrates a prior art virtual tape system.
Figure 5A:
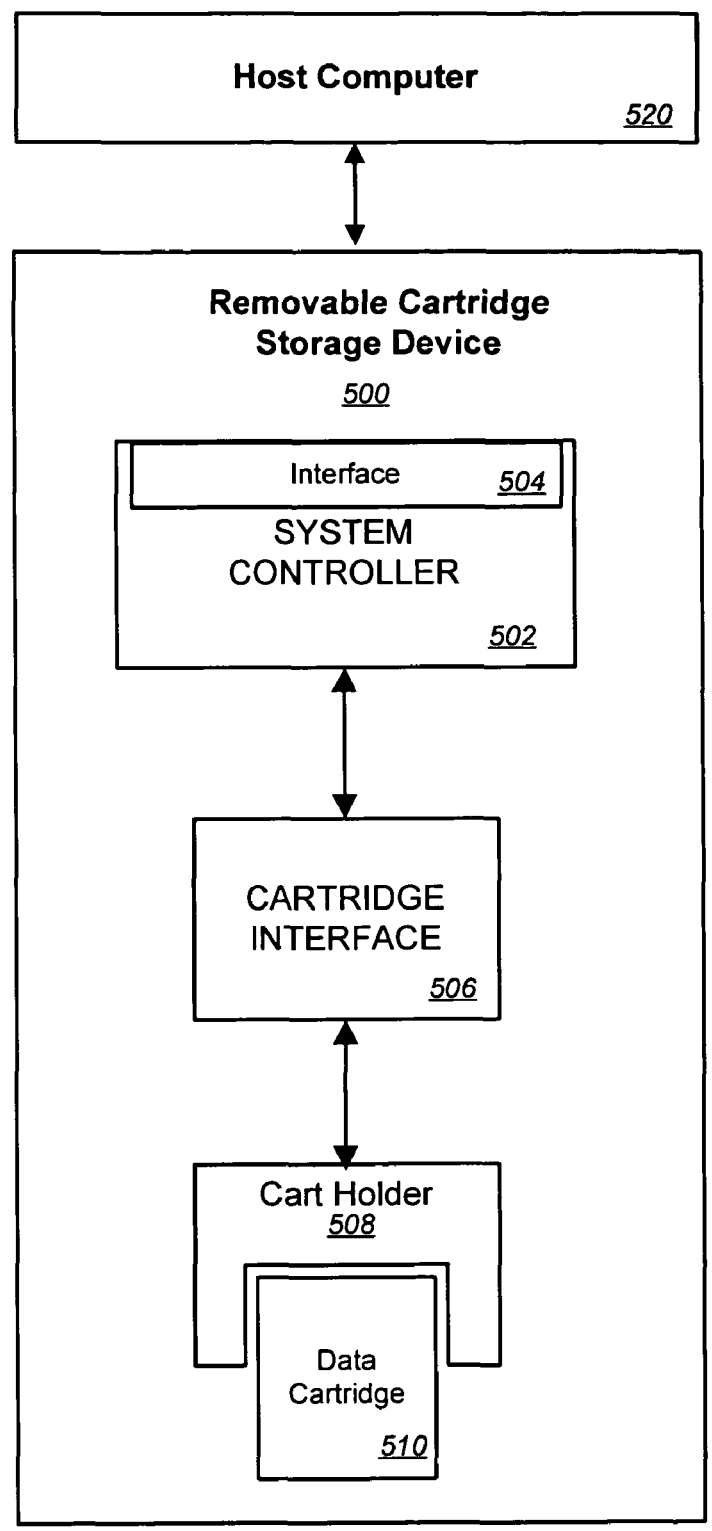
FIG. 5A illustrates an exemplary embodiment of a removable cartridge storage device.

FIG. 5A illustrates an exemplary embodiment of a removable cartridge storage device 500. The removable cartridge storage device 500 may include a system controller 502, a cartridge interface 506, and a cartridge holder 508. A host computer system 520 may be communicatively coupled with removable cartridge storage device 500. As will be described further below, portable data cartridges 510 may be removably coupled with removable cartridge storage device 500.

System controller 502 may process data commands and other types of commands (or requests) transmitted to the removable cartridge storage device 500. In some aspects, the system controller 502 may include an interface 504 to host computer 520. Interface 504 may be used to receive device commands and data from host computer 520 and to transmit data and other communications from removable cartridge storage device 500 to the host computer 520. By way of example, the interface 504 to the host computer 520 may be a any version of Small Computer System Interface (SCSI), a Fiber Channel (FC) interface, an Ethernet interface, an Advanced Technology Attachment (ATA) interface, or any other type of interface that allows the removable cartridge storage device 500 to communicate with a host computer 520. System controller 502 may also perform other functions to process data, such as data buffering, data compression, error correction coding (ECC) and data formatting for the data cartridge 508 used to store data. Other well-known functions of a system controller, such as error recovery, may also be performed by system controller 502.

In some embodiments, removable cartridge storage device 500 may emulate a tape device. In these aspects, system controller 502 may be configured to emulate a tape device and/or execute tape device commands (e.g., sequential tape device commands, such as any version of SCSI Stream Commands (SSC) or Advanced Technology Attachment Packet Interface (ATAPI commands). Hence, in some embodiments, data may be written to and read from portable data cartridge 508 sequentially. System controller 502 may translate tape device commands received from a host computer 510 into the appropriate commands for the removable cartridge storage device 500. Some of the tape device commands may not result in any action by removable cartridge storage device 500 (other than possibly an acknowledgement or success communication result) if the tape device command does not have a corresponding command for portable cartridges with electrical interfaces (e.g., rewind). System controller may also emulate a tape device when it transmit results and other communications back to host computer 510. Thus, the removable cartridge storage device 500 may appear to software applications (e.g., backup applications) running on the host computer 510 as a tape device. In alternative embodiments, the removable cartridge storage device 500 may appear to the host computer 510 as another type of storage device, such as a random-access block device (e.g., hard disk drive, optical disk drive, flash memory).

System controller 502 may be communicatively coupled with cartridge interface 506. Cartridge interface 506 may comprise electronic circuits which may be used to provide the physical electronic signaling to a portable data cartridge 510 (removably coupled with cartridge holder 508) to read and write data and to issue commands to the portable data cartridge 508. In one embodiment, the cartridge interface 506 may include a single port serial ATA (Advanced Technology Attachment).

Cartridge interface 506 may be communicatively coupled to a cartridge holder 508, which may be configured to removably couple with a portable data cartridge 510. Although FIG. 5A illustrates a data cartridge 510 inserted into the cartridge holder 508, at times, a data cartridge will not be inserted into cartridge holder 508. Additional data cartridges may also be used with the removable cartridge storage device 500.

Removable cartridge storage device 500 may be designed so that a portable data cartridge 508 may be inserted by a user at any time, regardless of the power state or other state of host computer 510. Other aspects may allow a data cartridge 508 to be ejected at the request of the user (e.g., by means of an eject button) and/or by command from an application, such as a software application executing on host computer 510. System controller 502, or other component, may include functionality to prevent the cartridge 508 from being ejected while a data transfer operation is in process. Prior art storage devices, such as Hard Disk Drives (HDDs), require the user to install and remove the device when the host computer is powered-off or by invoking special installation programs in the host computer or its operating system software. Unlike these types of devices, removable cartridge storage device 500 may enable portable data cartridges 508 to be asynchronously inserted without any user action with the host computer 510 or its operating software and without disrupting the operation of the host computer 510, including its file system.

It should be appreciated that in alternative embodiments, the removable cartridge storage device 500 may include additional, fewer, or alternative components than shown in FIG. 5A. For example, removable cartridge storage device 500 may include more than one interface, which may be the same or different than the type of interface 504. Other variations are also contemplated.

Figure 5B:
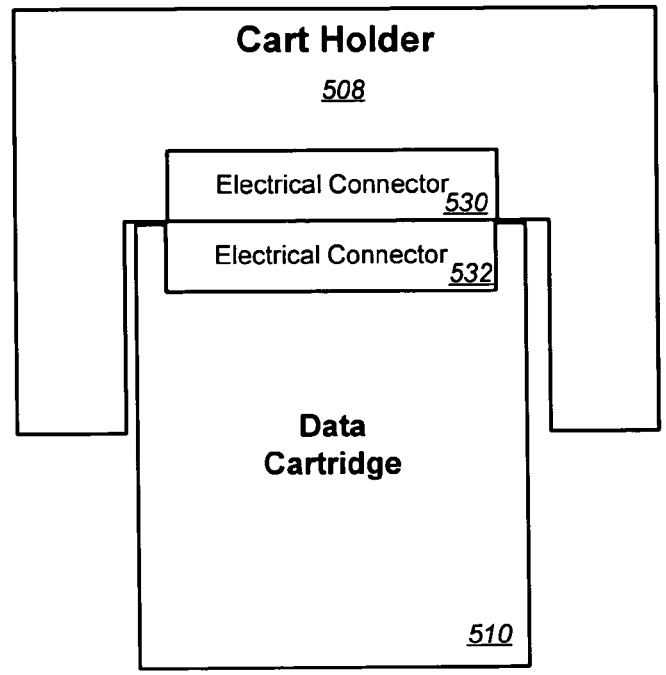
FIG. 5B illustrates an exemplary embodiment of the cartridge holder in FIG. 5A.

FIG. 5B illustrates an exemplary coupling between cartridge holder 508 and a portable data cartridge 510. Cartridge holder 508 may include an electrical connector 530. Data cartridge 510 may also includes an electrical connector 532 configured to mate with electrical connector 530. Thus, data cartridge 510 may be electrically coupled to the removable cartridge storage device 500 via cartridge holder 508 by mating its electrical connector 532 with the electrical connector 530 of the cartridge holder 508.

In other embodiments, cartridge holder 508 may removably couple and/or communicate with data cartridge 510 using different means. By way of example, cartridge holder 508 may use radio frequency, infra-red, or other types of wireless communications to communicate with data cartridge 510. Thus, it should be appreciated that data cartridge 510 and cartridge holder 508 may include alternative or additional communications to enable data cartridge 508 to communicate with removable cartridge storage device 500.

Figure 6:
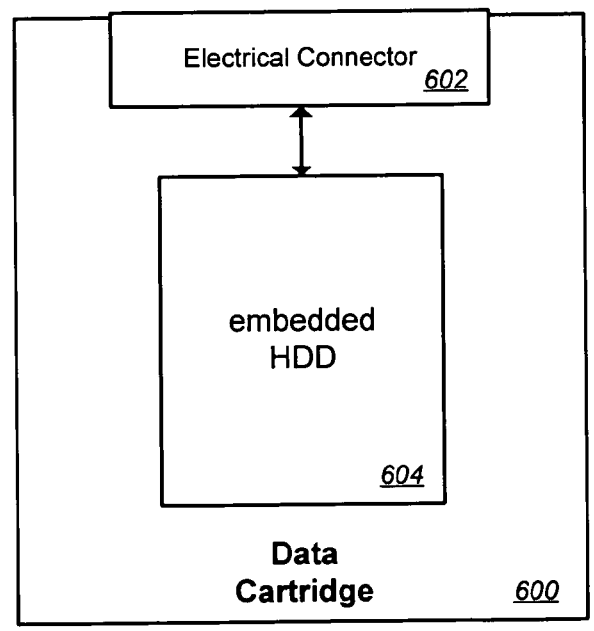
FIG. 6 illustrates an exemplary embodiment of a portable data cartridge.

FIG. 6 illustrates one exemplary embodiment of a portable data cartridge 600 which may be used in a removable cartridge storage device. The data cartridge 600 may include an electrical connector 602 configured to mate the data cartridge 600 to the removable cartridge storage device. When the data cartridge 600 is coupled with a removable cartridge storage device, the removable cartridge storage device may read data from the cartridge, write data to the cartridge, and issue commands to the cartridge. The data cartridge 600 may store the data in portable electronic format, so that the data persists after the data cartridge 600 is removed from a removable cartridge storage device. The data may also be stored in a format so that it is readable by storage devices other than the storage device that wrote the data to the data cartridge 600.

Data cartridge 600 may, in some aspects, include an embedded hard disk drive (HDD) 604. HDD 604 may include functionality similar to a standard HDD. For instance, data may be stored on HDD 604 by issuing a write command to the data cartridge 600 via electrical connector 602. Other known disk commands may also be issued to HDD 604 via the electrical connector interface 604.

In some embodiments, data cartridge 600 may have functional characteristics similar to a tape cartridge, such as an ergonomic form and low cost. In other embodiments, data cartridge 600 may not include an embedded HDD 604, but instead may include another type of data storage that has an electronic interface, such as optical or flash storage. Further details of features that may be included in data cartridge 600 may be found in previously incorporated provisional patent application No. 60/586,087, entitled "Electronic Storage Cartridge."

Figure 7:
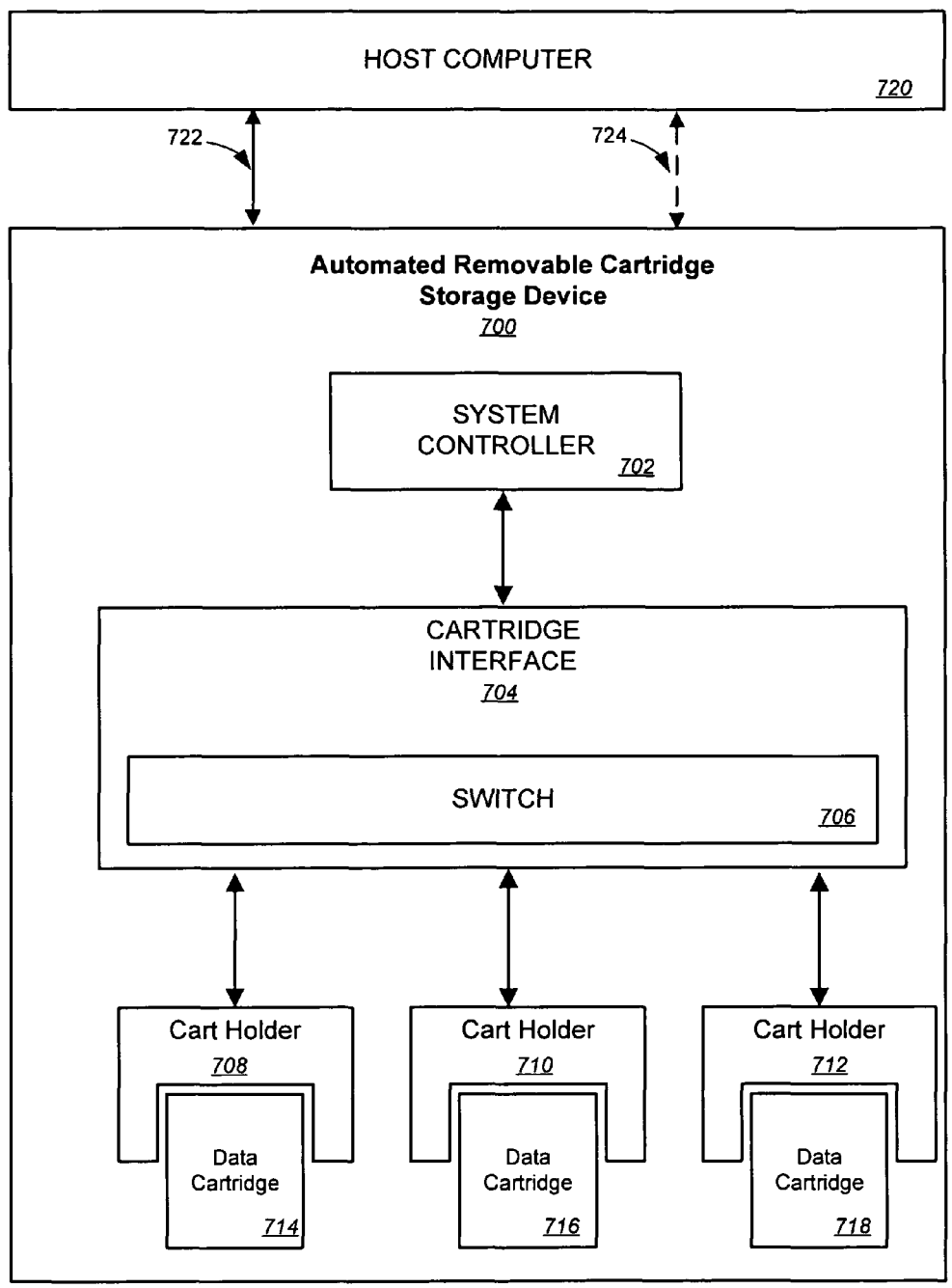
FIG. 7 illustrates an exemplary embodiment of an automated removable cartridge storage device.

FIG. 7 illustrates an exemplary embodiment of an automated removable cartridge storage device 700. The automated removable cartridge storage device 700 may be coupled with a host computer 720 via one or more connections 722, 724. In some aspects, connection 722 may be a data path connection used to transfer data and data commands/results and connection 724 may be a control path command used to transfer media changer commands/results. In other aspects, a single connection 722 may be used to transfer both data path and control path communications and connection 724 may not be included. Further details of both exemplary embodiments will be described below with reference to FIGS. 8 and 9. It should be appreciated that automated removable cartridge storage system 700 may also be coupled with additional host computer systems (not illustrated).

The automated removable cartridge storage device 700 include a system controller 702. System controller 702 may be configured to receive and execute commands from host computer 720. The commands received from host computer 720 may be data commands and/or media changer commands. System controller 702 may also perform any of the other functionality described with reference to the system controller 502 of FIG. 5A. Additional details of the configuration and functionality that may be performed by system controller 702 are also described below.

The automated removable cartridge storage device 700 may also include a cartridge interface 704, communicatively coupled with system controller 702. Cartridge interface 704 includes electronic circuitry which may be used to provide electronic signaling to multiple portable data cartridges 714, 716, 718 having electronic interfaces. Portable data cartridges 714, 716, 718 may be removably coupled with cartridge holders 708, 710, 712 using any of the mechanisms described elsewhere in this application (e.g., through mating electrical connectors). As previously described, the data cartridges 714, 716, 718 may include an embedded HDD or other type of storage that may be electrically coupled with data replication system 700. In alternate embodiments, the system 700 may include fewer or additional cartridge holders 708, 710, 712 to which a data cartridge 714, 716, 718 may be electrically coupled.

Cartridge interface 704 may also include a switch 706 or other type of electronic switching component, such as a multiplexer or other multi-port device, to electronically switch communication connections between system controller 702 and portable data cartridges 714, 716, 718 removably coupled with cartridge holders 708, 710, 712 by making, breaking, or routing electrical connections between system controller and each of the cartridge holders 708, 710, 712. In some embodiments, cartridge interface 704 may comprise a multi-port serial-ATA (Advanced Technology Attachment) or multi-port serial SCSI controller. In larger systems (e.g., in systems greater than 8 cartridges), the system controller 702 may include multiple electronic components and processes to simultaneously manage a subset of the data cartridges 714, 716, 718, each subset coupled to its own cartridge interface 704.

In some embodiments, the automated removable cartridge storage device 700 may emulate a tape automation device (e.g., tape autoloader, tape library). Thus, system controller 702 or another component may provide the functionality to emulate the control path to a tape automation device used by applications to issue media changer commands to the automated removable cartridge storage device 700. Media changer commands to perform system configuration and diagnostics may also be processed by system controller 702. Merely by way of example, system controller 702 may emulate a SCSI tape autoloader device and may process any version of the SCSI media changer commands (e.g., Initialize Element Status, Read Element Status, Move Medium, Exchange Medium, etc). It should be appreciated that system controller 702 may also emulate other types of devices and may process other types of media changer commands.

Automated tape device commands that are received may be translated to the appropriate command for the automated removable cartridge storage device 700. For instances, commands such as load and unload may be translated into commands that cause the cartridge interface 704 to electronically switch from one cartridge 714, 716, 718 to another cartridge. As other examples, audit commands (e.g., Initialize Element, Read Element Status) and/or move medium commands may be performed electronically by the system controller 702. Exemplary methods that may be performed by a system controller 702 to process media changer commands are described below.

In embodiments in which the automated removable cartridge storage device 700 emulates an automated tape device, storage elements may be represented in the inventory by each of the cartridge holders 708, 710, 712. Data transfer elements may be represented by the system controller (e.g., data formatter component) and its connection to a cartridge holder 708, 710, 712 via the cartridge interface switch 706. The medium transport element may virtually be represented by the cartridge interface 704, in which the electronic switching operation of the signal path between the system controller 702 and the cartridge holders 708, 710, 712 substitutes for the physical movement of data cartridges 714, 716, 718. The import/export element may be virtually represented by the ejected state of the portable data cartridge 714, 716, 718 from its cartridge holder 708, 710, 712.

System controller 702 may also emulate a tape device and process tape commands. Merely by way of example, system controller may receive and process any version of the SCSI Stream Commands. Data associated with sequential write commands may be sequentially written to portable data cartridges. Similarly, data associated with sequential read commands may be sequentially read from portable data cartridges.

In some aspects, system controller 702 may maintain an inventory of the portable data cartridges 714, 716, 718 which are removably coupled with the cartridge holders 708, 710, 712. In aspects in which the storage device 700 emulates an automated tape device, the storage device may also maintain an element inventory which includes physical and logical addresses for the elements. The physical address may correspond to the physical configuration within the storage device system and the logical address may be the address used by the host computer when it issues media changer commands to the automated removable cartridge storage device 700. In aspects in which the system controller has the ability to operate more than one portable data cartridge 714, 716, 718 at a time, multiple logical addresses may be assigned to the system controller. Some elements may have unchangeable addresses, such as the data transfer elements (system controller 702 connection to cartridge interface 708, 710, 712), medium transport element (virtually represented by switch 706), and import/export elements (virtually represented by eject state of data cartridge). The logical addresses for these unchangeable elements may always be associated with the same physical address. For other elements, such as the cartridge holders, the logical addresses associated with the cartridge holders 708, 710, 712 may be swapped (e.g., if a move medium or exchange medium command is received). It should be appreciated that the element inventory may also include the portable cartridge inventory, or the portable cartridge inventory may be maintained as a separate inventory. It should also be appreciated that the portable cartridge inventory and/or element inventory may be stored on a non-volatile memory (e.g., EEPROM) of system controller 702 or other component of storage device 700.

A suitable housing structure may be used to hold multiple cartridge holders 708, 710, 712. The structure may be designed so that an operator may have access to the cartridge holders to add and remove cartridges 714, 716, 718. One exemplary housing structure will be described below in reference to FIG. 11. Alternately, a robotic mechanism may be employed to enter and remove cartridges from the housing structure.

In an alternate embodiment, the automated removable cartridge storage device 700 may take the place of one or more tape drives within an existing tape automation system, such as a tape autoloader or tape library. The data cartridges 714, 716, and 718 may be mechanically loaded and unloaded into cartridge holders 708, 710, 712 from storage slots within the automation system by a robotic mechanism. Thus, the cartridges 708, 710, 712 may be sized and shaped so that they may be handled by the robotic mechanism. This may provide the ability for customers to use portable disk data cartridges or other type of removable cartridge having an electrical interface within existing tape systems.

It should be appreciated that automated removable cartridge storage device 700 may provide capabilities not available in traditional autoloader devices or tape libraries having multiple tape drives. Unlike traditional automation systems, the storage device 700 may electronically, instead of mechanically, switch between cartridges. Thus, storage device 700 may be able to switch cartridges much more rapidly (e.g., less than one second) than traditional automated systems that mechanically move cartridges. Additionally, unlike virtual tape systems, the storage device 700 may be used with portable data cartridges that retain data after removal from the storage device 700 and may be read by other storage device systems. System controller 702 may also operate each portable data cartridge independently of the other portable data cartridges. In some cases, each portable data cartridges 714, 716, 718 may include its own independent data set. In other aspects, portable data cartridges 714, 716, 718 may be formatted in a RAID format, as described further below.

Another capability that may be provided by automated removable cartridge storage device 700 is a single system controller that may be used to control data operations for multiple data cartridges. Thus, data may be copied from one data cartridge 714 to a second data cartridge 716 using the single system controller 702 without the need to first transfer the data to the host computer. The use of a one system controller 702 may also allow sequential load and copy functions to be performed in parallel, thereby providing the functions of an autoloader and a mirroring system with a single controller. For instance, the system controller 702 may be able to operate all of the cartridges 714, 716, 718 close to simultaneously by bursting data to a data cartridge 714, 716, 718 and then electronically switching to a different cartridge while the first data cartridge processes the burst data. Other capabilities may also be provided by storage device 700 which uses a single system controller 702 to manage-multiple removable data cartridges 714, 716, 718.

Figure 8:
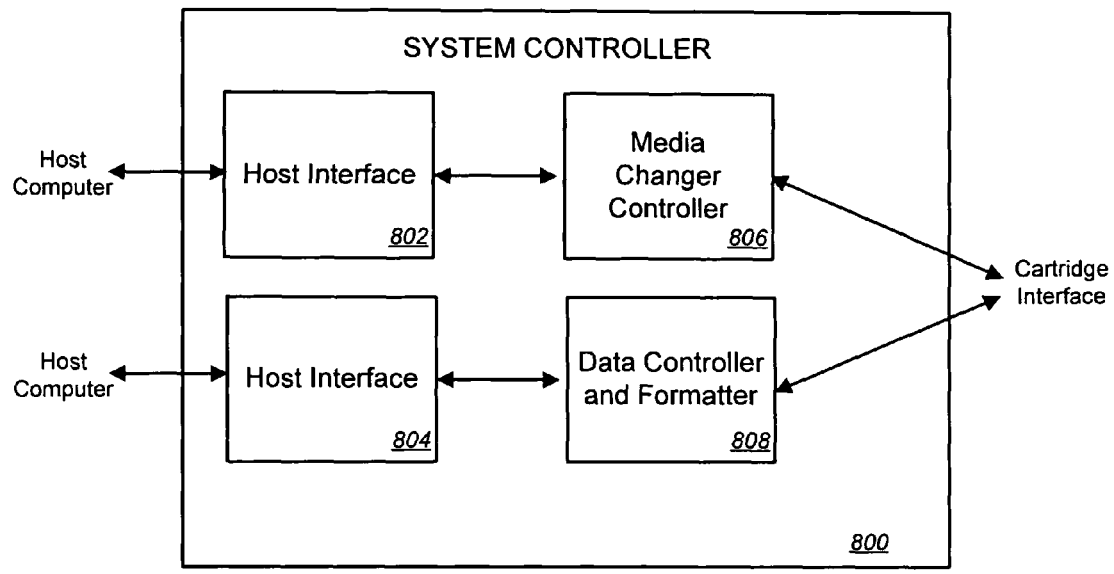
FIG. 8 illustrates a first exemplary embodiment of a system controller that may be included in a removable cartridge storage device.

FIG. 8 illustrates an exemplary embodiment of components that may be included in a system controller of an automated removable cartridge storage device. System controller 800 includes a host interface 802, such as a SCSI, FC, Ethernet, or other type of communications interface. Host interface 802 may be used to send and receive media changer communications to and from a host computer. In one embodiment, media changer communications may be a standardized communication protocol, such as any version of the SCSI Media Changer command set (e.g., SCSI-3 Media Changer command set). Other communication protocols may also be used.

System controller 800 also includes an additional host computer interface 804 (SCSI, FC, etc.) which may be used to receive data and commands to control the transfer/formatting of data from a host computer. Host computer interface 804 may also be used to transfer data (e.g., for restore operations) and results of data operations from the system controller 800 to the host computer. Merely by way of example, host computer interface 804 may be any version of SCSI, a Fiber Channel interface, an Ethernet interface, an ATA interface, or any other type of interface that may be used to transfer data and data command communications. It should be appreciated that the host computer may either be the same or different host computer than that communicating with host computer interface 802.

Functionality performed by system controller 800 may be logically partitioned into a media changer controller (MCC) 806 and data controller/formatter 808. MCC 806 is communicatively coupled with host computer interface 802. MCC 806 may be used to process media changer commands, such as audit commands, commands to electronically switch between data cartridges, or any other type of media changer command. Data controller 808 is communicatively coupled with host computer interface 804 and may be used to control data transfers and formatting of data. By way of example, data formatting operations performed by data controller 808 may include block packing, data compression, header creation, or other formatting to prepare data for recording on one or more cartridges in a native format of the cartridge. System controller 800 may optionally include a data buffer (not shown) that may be used by data controller 808 during transfer/formatting operations.

In some embodiments, MCC 806 may be used to emulate an automated tape device (e.g., autoloader, tape library). Media changer commands received from a host computer may thus be translated by MCC 806 into the appropriate commands (if any) for the automated removable cartridge storage device and translate results into the format expected by host computer. By way of example, MCC 806 may process a load command by electrically switching the switch to the appropriate cartridge. In some cases, data controller 808 may also emulate a tape drive, optical drive, or other type of device.

It should be appreciated that FIG. 8 illustrates an exemplary logical partitioning of functionality performed by system controller 800. MCC 806 and data controller 808 may be components of the same or different processor and may be implemented as one or more embedded software processes. It should also be appreciated that system controller 800 may include additional components.

Figure 9:
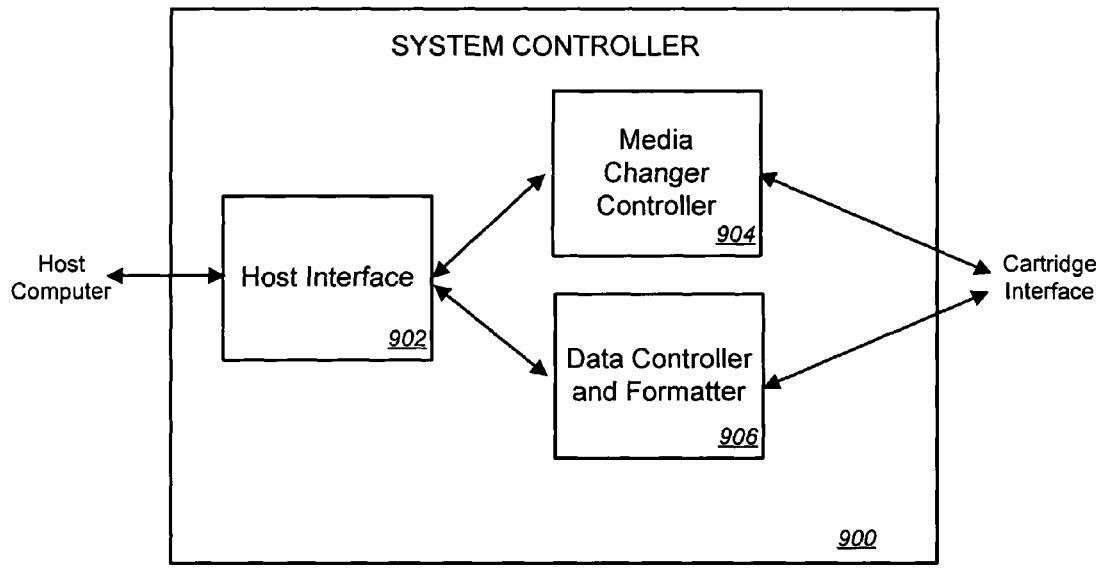
FIG. 9 illustrates a second exemplary embodiment of a system controller that may be included in a removable cartridge storage device.

FIG. 9 illustrates a second exemplary embodiment of components that may be included in a system controller of an automated removable cartridge storage device. This embodiment is similar to that described with reference to FIG. 8, with the difference being that a single host computer interface 902 is shared by both media changer controller 904 and data controller 906.

Figure 10A:
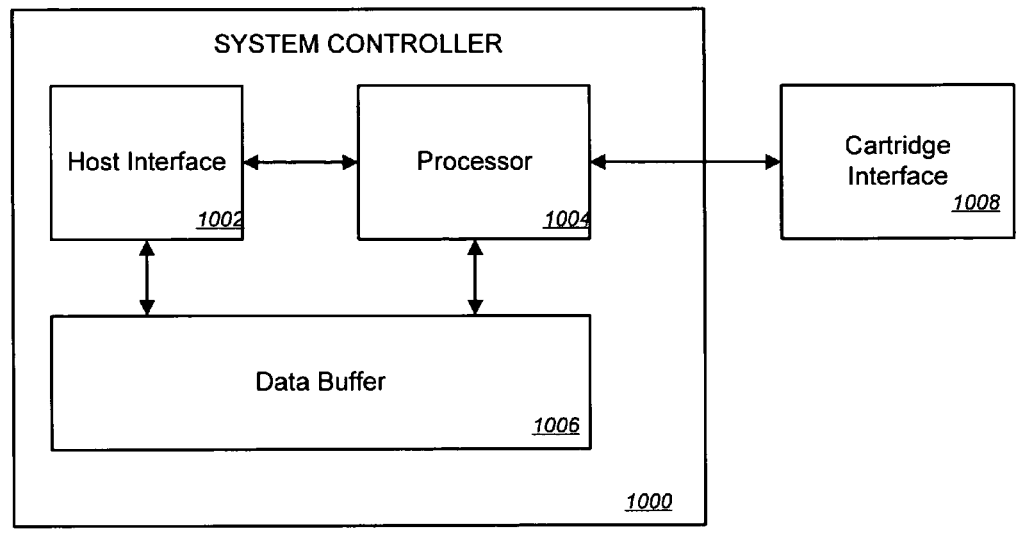
FIG. 10A is a block diagram of exemplary components of a system controller.

FIG. 10 illustrates another exemplary embodiment of components that may be included in a system controller. The system controller 1000 includes a host interface 1002, such as a SCSI, FC, Ethernet, or other type of communications interface. The host interface 1002 may be used to send and receive communications from a host computer. Host interface 1002 is coupled to a data buffer 1006 that may be used to store incoming and outgoing data. By way of example, data buffer 1006 may be dynamic random access memory (DRAM). Other types of memory may also be used.

System controller 1002 further includes a processor 1004 which may be used to process data (e.g., format data, compress data, etc.) and manage communications and data transfers to the data cartridges. The components of system controller 1002 may be implemented as a combination of electronic circuits, a microprocessor, and embedded software which runs on the microprocessor and operates the circuitry. It should be appreciated that in alternate embodiments, the system controller 1002 may include different components than those described with reference to FIG. 10A. For instance, in some embodiments, the system controller 1002 may include additional host interfaces 1002 to allow communications with more than one host computer or to receive media changer commands from host computer.

Figure 10B:
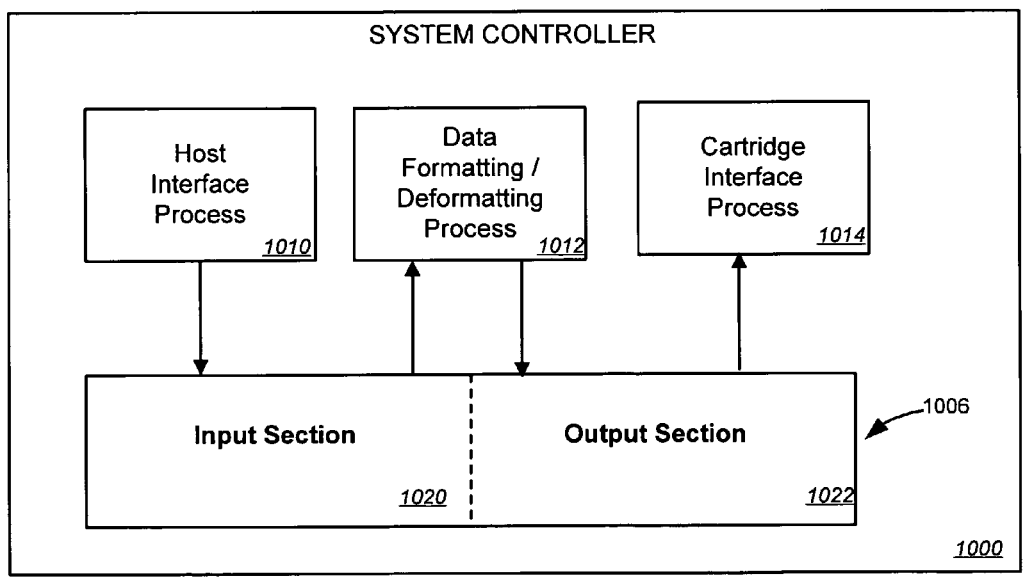
FIG. 10B is a block diagram of exemplary software operations of a system controller.

FIG. 10B illustrates an exemplary block diagram of embedded software processes that may be performed by system controller 702 when receiving data and data commands from a host computer. Host interface process 1010 may be used to receive data commands and data transfers and put them in the input section 1020 of data buffer 1006. In some aspects, host interface process 1010 may also be used to receive media changer commands, some of which are translated to control a cartridge interface to virtually load and unload portable data cartridges by operating an electronic switching mechanism. In some embodiments, host interface process 1010 may emulate an automated tape device, such as a tape autoloader or tape library and/or a tape device.

Data formatting process 1012 may be used to remove data from the input section 1020 of the data buffer 1006 and perform formatting operations on the data. By way of example, data formatting process may perform block packing, data compression, header creation, and/or other formatting to prepare the data for recording on one or more portable cartridges in a native format of the cartridges.

In some embodiments, data formatting process 1012 or another process of system controller 1000, may be used to format the data in a Redundant Array of Inexpensive Disks (RAID) format for transfer to the number of data cartridges needed to support the selected RAID format. The use of a RAID format may provide for additional fault tolerance for data restoration. In the event that one of the data cartridges used in the RAID becomes corrupted, the remaining cartridges in the array may store enough information so the data may still be restored. Thus, the data cartridges may form a redundant set of independent disk cartridges (RAID-RC), in which a variety of RAID formats (e.g., RAID-3, RAID-5, RAID-6) may be used. After the data formatting process 1012 has finished formatting the data, the data may be sent to the output section 1022 of the data buffer 1006. The cartridge interface process 1014 may then remove the formatted data as needed to manage the communication and data transfer to a data cartridges 714,716, 718. In some embodiments, more than one cartridge interface process 1014 may be provided to transfer data in parallel to data cartridges.

Although the above description described the functionality performed by system controller 1000 when data and commands are received from host computer, it should be appreciated that similar functionality in reverse may be performed by the processes to send data to the host computer. For instance, host interface process 1010 may retrieve data from data buffer 1006 for transmittal to the host computer. As another example, the data process 1012 may also be used to de-format data for transmittal to the host computer, as well as performing other types of data operations (e.g., uncompressing data) for transmittal to the host computer. Additionally, cartridge interface process 1014 or other process may be used to receive data read from data cartridges during read operations. In alternative embodiments, the system controller 1000 may include fewer, different, or additional processes to manage data transfers between host computer and data cartridges removably coupled with the storage device.

Figure 11:
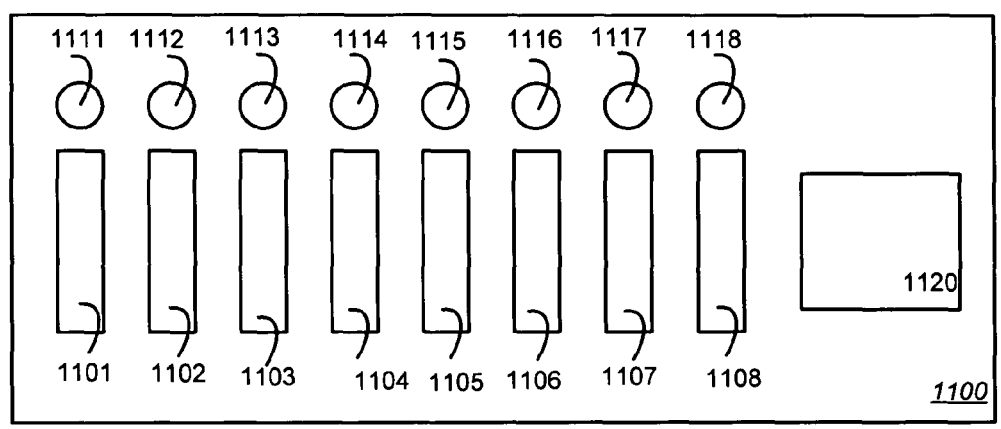
FIG. 11 illustrates an exemplary embodiment of a front view of a an automated removable cartridge storage device.

FIG. 11 illustrates a front view of an exemplary embodiment of an automated removable cartridge storage device 1100. The device 1100 includes a plurality of cartridge holders 1101-1108 for receiving removable cartridges. Each cartridge holder 1101-1108 may define an opening exterior to the removable cartridge storage device 1100 to receive a portable data cartridge. In some aspects, the cartridge holders 1101-1108 may each have an associated eject button 1111-1118 for ejecting the cartridge from the cartridge holder. Additionally, in some embodiments, status indicators (not shown), such as light emitting diode (LED) status indicators, may also be provided for each cartridge. The removable cartridge device 1100 may further include a control panel interface 1120 to display autoloader device information, configure the storage device 1100, power on/off the autoloader, and/or reset the device 1100.

In the embodiment illustrated in FIG. 11, the location of the cartridge holders 1101-1108 on the front panel may make it easy for an operator to insert or remove cartridges. Thus, unlike prior art tape autoloaders with an single import/export mechanism feature, an operator of removable cartridge storage device 1100 may insert or remove as many cartridges as desired without repeatedly performing a sequence of control panel keystrokes. Instead, the operator may merely insert or plug the data cartridges into the cartridge holders 1101-1108 or press the associated eject button 1111-1118 to eject a cartridge. Thus, the removable cartridge storage device 1100 may, in effect, provide multi-cartridge import-export functionality. In alternative embodiments, one or more of the cartridge holders 1101-1108 may not be included on the front panel and the removable cartridge storage device 700 may provide another mechanism (such as a conventional import/export mechanism) to insert and remove cartridges into the device 700.

It should be appreciated that in alternate embodiments, the automated removable cartridge storage device 1100 may include additional or fewer cartridge holders 1101-1108. Additionally, in alternate embodiments, the device 800 may include fewer or additional components than shown in FIG. 11.

Figure 12:
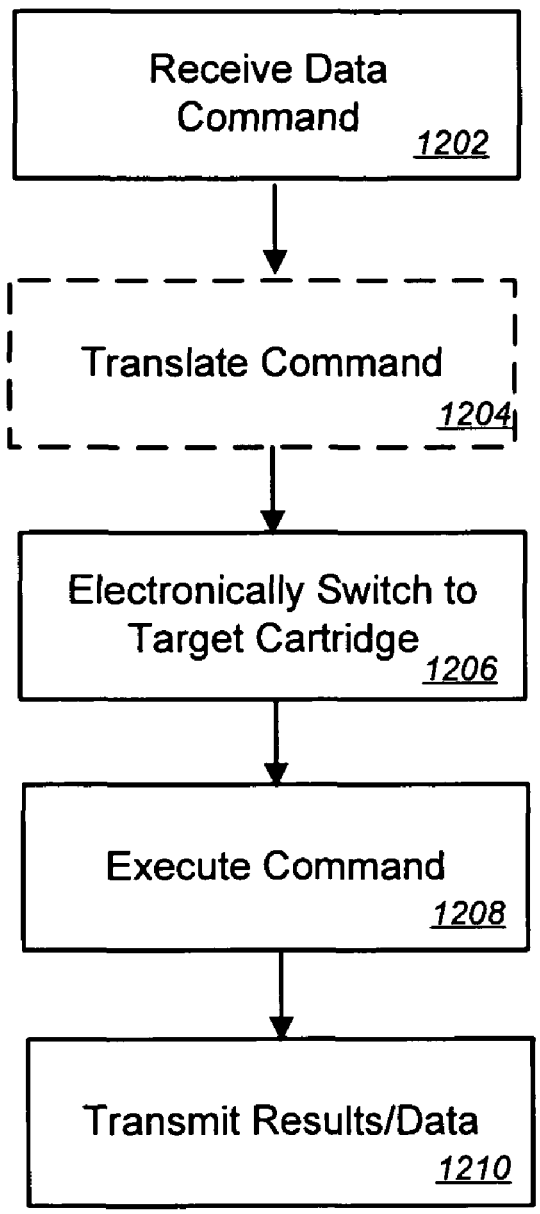
FIG. 12 is a flow diagram illustrating an exemplary method that may be performed by a removable cartridge storage device to process data commands.

FIG. 12 illustrates an exemplary method that may be performed by a system controller or other component of a removable cartridge storage device to process data commands. The method may begin by receiving 1202 a data command from a host computer coupled with the removable cartridge storage device. The data command may be a data transfer command or other type of command associated with data transfer operations. Merely by way of example, the data command may be a read command, a write command, a copy command, or a medium movement command (e.g., rewind, seek).

In some embodiments, the removable cartridge storage device may emulate a tape device. In these embodiments, the received 1202 data command may be a sequential tape command (e.g., a SCSI Stream Commands) or other type of tape command. The system controller, or other component, may translate 1204 the command into a command suitable for the electronic medium of the portable data cartridges. For instances, a rewind or other movement command may be translated into a seek command or other appropriate command. Other types of commands may also be translated 1204 into a different type of command for the portable data cartridges and/or removable cartridge storage device. Some commands may not result in any action by the removable cartridge storage device (other than possibly reporting results), as the command my not have an equivalent command associated with the portable data cartridge. Furthermore, the action associated with some commands may be delayed until a subsequent command is received. By way of example, a seek command may not be executed until a subsequent write or read command is received. It should be appreciated that in alternative embodiments, the method may not include translating 1204 the data command.

At some point, the system controller may cause a cartridge interface component of the storage device to electronically 1206 switch communications to the target data cartridge. The switching 1206 to the target cartridge may occur before the data command is received 1202, immediately before executing 1208 the command, and/or after receiving a subsequent data command 1202. Merely by way of example, communications between the system controller and the portable data cartridges may have been switched in response to a load or move command previously received. As another example, the received 1202 command may be a data operations command (e.g., read, write, copy) or other type of command for which the system controller causes the switch to switch communications to the target cartridge (data source and/or destination) prior to executing the data operation command. In some aspects, this may occur immediately before executing 1208 the data operation or a portion of the data operation. Other types of data commands, such as media movement commands (e.g., rewind, seek, etc.) may not be immediately executed 1208 until a subsequent command (e.g., a data operations command) is received. Thus, the system controller may not electronically switch 1206 to the target cartridge until after the subsequent command is received.

At block 1208, the data command is executed 1208. In some aspects, a sequence of commands may be executed 1208 (e.g., a seek command or other move media command followed by a read command or other data operations command). Optionally, the system controller may execute 1208 the command simultaneously with other commands for different target cartridges. For some types of commands, the system controller may perform data formatting (e.g., block packing, data compression, header creation), de-formatting, data compression, data uncompression, and/or data buffering while executing 1208 the command. Thus, it should be appreciated that the system controller may cause the switch to electronically switch 1206 to the target cartridge multiple times during the execution 1208 of the command.

One example of a data command that may be executed 1208 by removable cartridge storage device is a copy command. Unlike traditional data storage devices, the removable cartridge storage device may be able to execute the copy command without first transferring the data to be copied to the host computer. Instead, the system controller may read the data from the source data cartridge, electronically switch to the destination data cartridge, and write the data to the destination data cartridge directly from its data buffer. Thus, the copy operation may be able to be performed more quickly and efficiently than a traditional storage device.

At block 1210, the removable cartridge storage device may transmit 1210 a result and/or data to the host computer. In some instances, the removable cartridge storage device may transmit a success result even though the execution of the command has been delayed to a later time. For example, in embodiments in which the storage device is emulating a tape device, the removable cartridge storage device may transmit 1210 a success result for a media movement command, even though the corollary command for the electronic data cartridges has not yet been executed.

Figure 13:
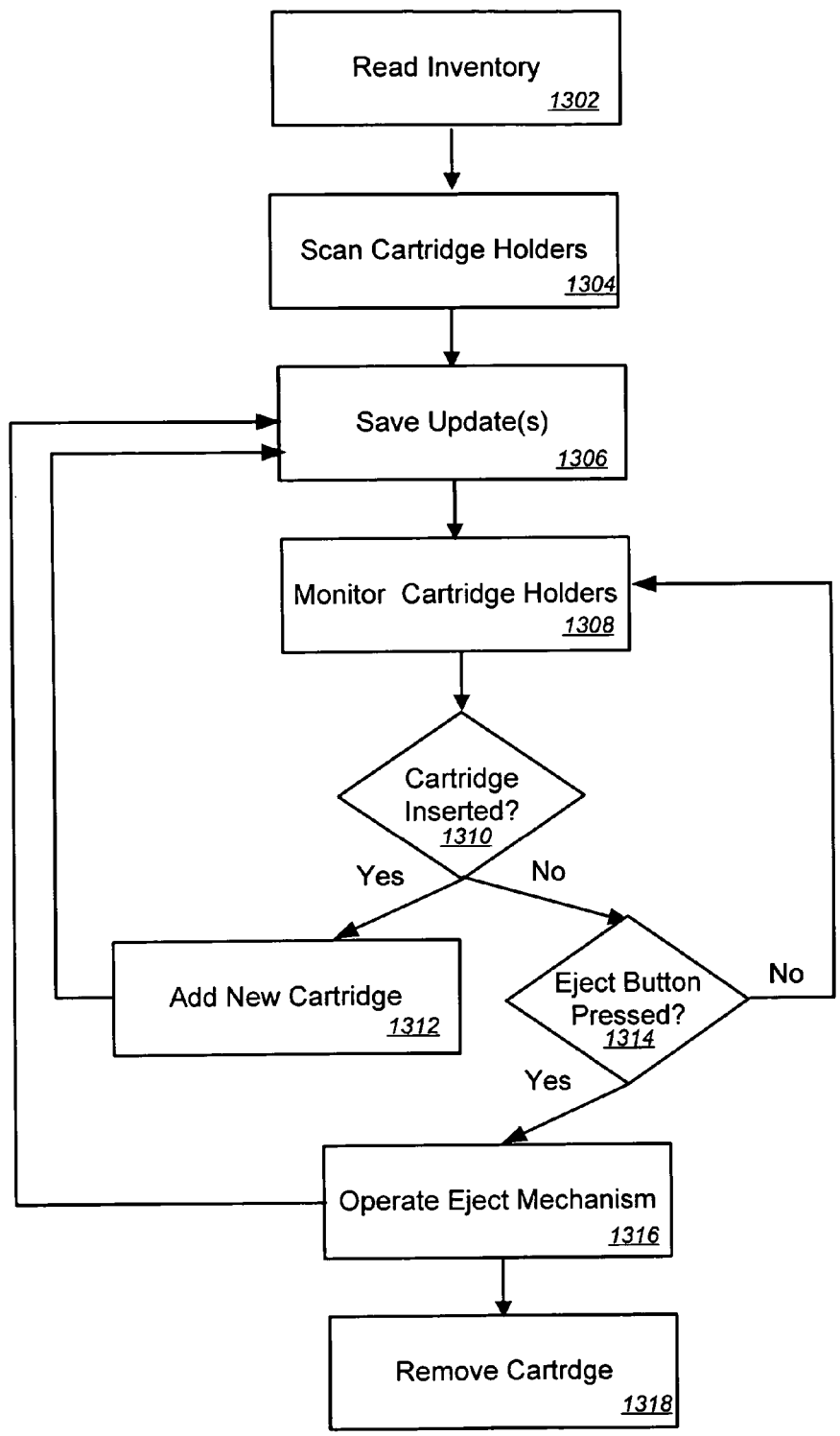
FIG. 13 is a flow diagram illustrating an exemplary method that may be performed by a removable cartridge storage device to audit and/or maintain an inventory of portable data cartridges.

FIG. 13 illustrates an exemplary method that may be performed by a removable cartridge storage device to audit and/or maintain an inventory of portable data cartridges. The audit may be initiated when the removable cartridge storage device is powered on or reset. Alternatively, the audit may be initiated by receiving a command from a host computer (e.g., Initialize Element Status, or other type of audit command) or a user directly interacting with a control panel of the removable cartridge storage device.

The audit process may begin by reading 1302 an inventory saved in a memory of the storage device. The inventory may include address for the elements included in the storage device. In some embodiments, the inventory list may include both physical addresses and logical addresses used by host computer(s) when it issues commands to the storage device. In other embodiments, the mappings between the physical and logical addresses may be maintained in a separate inventory list or may not be used. In some cases, data cartridges in the inventory list may be associated with one or more elements. For example, in embodiments in which the storage device emulates an automated tape device, a data cartridge may be associated with both the cartridge holder element to which it is removably coupled and a data transfer element (virtually represented in the storage device by a connection between the system controller and a cartridge holder).

If the storage device has not been previously audited, the removable cartridge storage device may create the initial inventory list instead of reading 1302 an inventory in saved memory. Alternatively, an empty inventory list may be read from memory. The empty inventory list may not include any data cartridges, but instead may include the physical addresses of the cartridge interfaces and in some embodiments, the logical addresses associated with addresses used by host computer(s) communicating with the storage device and addresses of other elements virtually represented in the removable cartridge storage device.

At block 1304, the removable cartridge storage device scans the cartridge holders to determine the presence of a data cartridge. The label of the data cartridge may also be determined. Any suitable technique may be used to scan 1304 the cartridge interfaces. For example, the system controller or other component of the storage device may determine the presence of a data cartridge by electronically reading a sensor associated with the cartridge holder. Alternatively, the system controller (or other component) may attempt to communicate with each of the cartridge interface to determine if a data cartridge is coupled with the cartridge interface. Unlike traditional storage devices relying on mechanical means to perform audits, the removable cartridge storage device may perform the audit by scanning 1304 the cartridge holders electronically, instead of mechanically. Thus, the audit of the storage device may be performed more quickly than traditional storage systems A cartridge holder may include information different than the saved inventory list if a user changed, added, or ejected cartridges while the storage device was powered down or otherwise inoperable. If the status of a cartridge holder has changed from the saved inventory, the inventory is updated with the new information. The updated inventory is saved 1306 to the memory of the storage device. The inventory list may then be used to process subsequent commands from the host computer to retrieve the inventory or partial inventory (e.g., Read Element Status).

In order to keep the inventory up to date, the removable cartridge storage device may execute a background process or other type of process to monitor the cartridge holders 1308. If an insertion of a cartridge is detected 1310, the new cartridge is added to the inventory list and the updated inventory is saved 1306. If the system controller, or other component, detects that an eject button was pressed 1314, the cartridge may be removed 1318 from the inventory list and the updated inventory list may be saved 1306. Optionally, the system controller may control eject operations in order to help prevent cartridges from being ejected during data transfer operations. In these embodiments, the system controller may also cause an eject mechanism to be operated 1316 to permit the ejection (assuming data transfer operations are not taking place or the data transfer operation has concluded).

Figure 14:
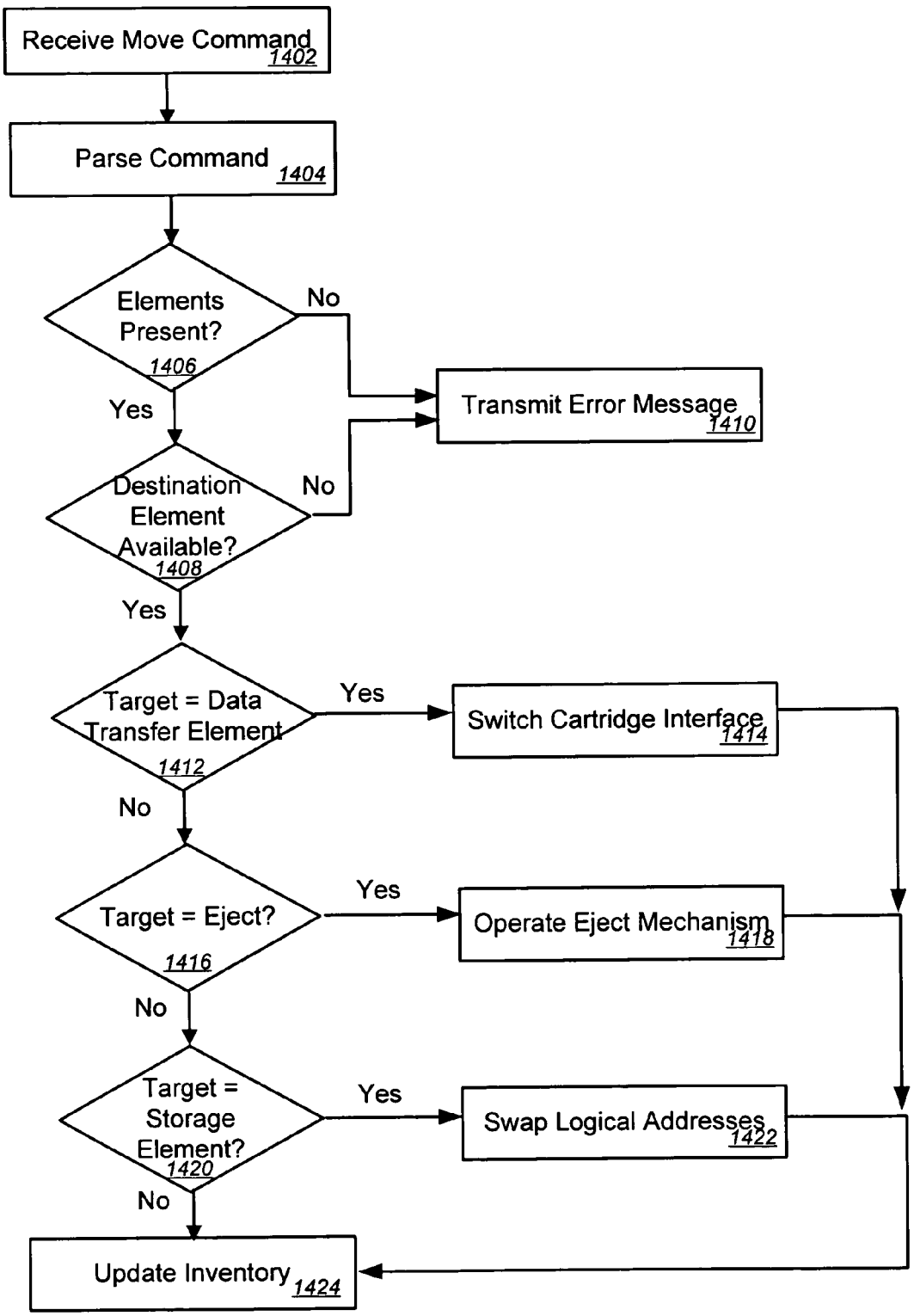
FIG. 14 is a flow diagram illustrating an exemplary method that may be performed by a removable cartridge storage device to process a move command.

FIG. 14 illustrates an exemplary method that may be performed by a removable cartridge storage device to process a move command. At block 1402, a move command is received 1402. A move command may be received 1402 in embodiments in which the storage device is emulating an automated tape device. Merely by way of example, the move command may be any version of the SCSI Move Medium command. In other aspects, the move command may be another type of SCSI move command (e.g., a move command directing a robotic tape library to move cartridges), a Fiber Channel move command, or other type of move command issued to an automated tape device. Alternatively, the received move command may be a virtual move command directing the storage device to electronically switch communications to a target data cartridge (virtually move cartridge to data transfer mechanism), virtually move the target data cartridge to an import/export mechanism (which may enable the eject mechanism), or other type of virtual move command. In these embodiments, the storage device may not be emulating an automated tape device. Additional embodiments may also implement move commands. It should be appreciated that in further embodiments, the removable cartridge storage device may not implement or process move commands.

The received 1402 command may be parsed 1404 to determine the source element for the move command and the destination element for the move command. The source or destination element may be a cartridge holder (storage element), a data transfer element (virtually represented by a communication connection between the system controller and a data cartridge), an import/export element (virtually represented by an entered/ejected state of the cartridge and/or enablement of an eject mechanism associated with the cartridge), or other types of element that may be included in the removable cartridge storage device. In alternative embodiments, the move command may include additional or alternative parameters than source/destination elements. For instances, the move command may specify a data cartridge instead of a source element. Thus, alternative, additional, or fewer parameters may be parsed 1404 from the move command.

If 1406 any of the required parameters are not present (e.g., source/destination elements), an error message is transmitted 1410 to the host computer. For instances, the source/destination elements may not be present if the host computer incorrectly identified an element and/or has an invalid configuration for the removable cartridge storage device. As another example, an error message may be transmitted 1410 to the host computer if a cartridge parameter specified in the move command is not present.

At block 1408, a determination is made as to whether the destination element for the move command is available. A determination 1408 may be made that a destination element is not available in a variety of different circumstances. For instances, the storage device may determine a data transfer element is not available if the system controller is busy transferring data or reading data from another data cartridge. As another example, the storage device may determine an element is not available if it is occupied by another cartridge. Even though the removable cartridge storage device may be able to virtually move cartridges to an occupied element (e.g., by swapping the cartridge's logical addresses), this may result in inconsistencies between the inventory maintained by the host computer and the inventory maintained by the storage device. Thus, the host computer may inadvertently issue commands associated with data cartridge(s) other than the intended data cartridge(s) intended to be associated with the command. In alternative embodiments, this may not be a consideration and/or may be addressed in a different manner, and thus, the removable cartridge storage device may determine 1408 the destination element is available even if it is occupied. The storage device may also determine the destination element is not available in other circumstances. If the storage device determines 1408 the destination element is not available, it may transmit 1410 an error message to the host computer.

Otherwise, the host computer may proceed with processing the move command. The move command may be processed differently, depending upon the targeted destination element. If 1412 the target destination element is a data transfer element, a cartridge interface may be operated to switch 1414 an electronic connection from the system controller to the desired cartridge (located in the source element or specified in the move command). At block 1424, the inventory may be updated to reflect the data transfer element virtually represented by the connection between the system controller and a cartridge interface has been changed. In some embodiments, the inventory may reflect the cartridge occupies both a data transfer element and a cartridge holder (storage element). In these aspects, the inventory may reflect the logical address of the cartridge holder is available.

If 1416 the target destination is an import/export (eject) mechanism, the storage device may operate 1418 an eject mechanism to allow an operator to remove the cartridge. Alternatively, no action may be taken as the operator may be allowed to press an eject button or other type of mechanism to remove the cartridge at any time, or the eject mechanism may not be operated until an operator presses the eject button. The removable cartridge storage device may also update 1424 its inventory to remove the ejected cartridge from the inventory.

If 1420 the target destination element is another storage element, the storage device may swap 1422 the logical address used by the host computer for the source cartridge holder with the logical address used by the host computer for the destination cartridge holder. The storage device inventory 1424 may also be updated to reflect this change.

Other suitable actions may alternatively or additionally be performed by the removable cartridge storage device to execute the move command. It should be appreciated that the time required to complete the move operation may be nearly instantaneous since the move operation may be completed electronically. Thus, removable cartridge storage device may provide a significant advantage over conventional mechanical storage systems which take tens of seconds to perform move operations.

Variations to the method described above are contemplated. For example, in some embodiments, the removable cartridge storage device may implement a physical import/export element(s) to import/export cartridges into the device and/or physical storage elements may be locations in the storage device which are not in communication with the system controller. Thus, the receipt of a move command may result in physical movement of the cartridge. As another example, the removable cartridge storage device may implement a physical cartridge mover (e.g., to move cartridges from storage elements not connected to the switch to elements that are connected to the switch). Thus, in some instances, the move command may be executed physically instead of electronically. Other variations are also contemplated.

Figure 15:
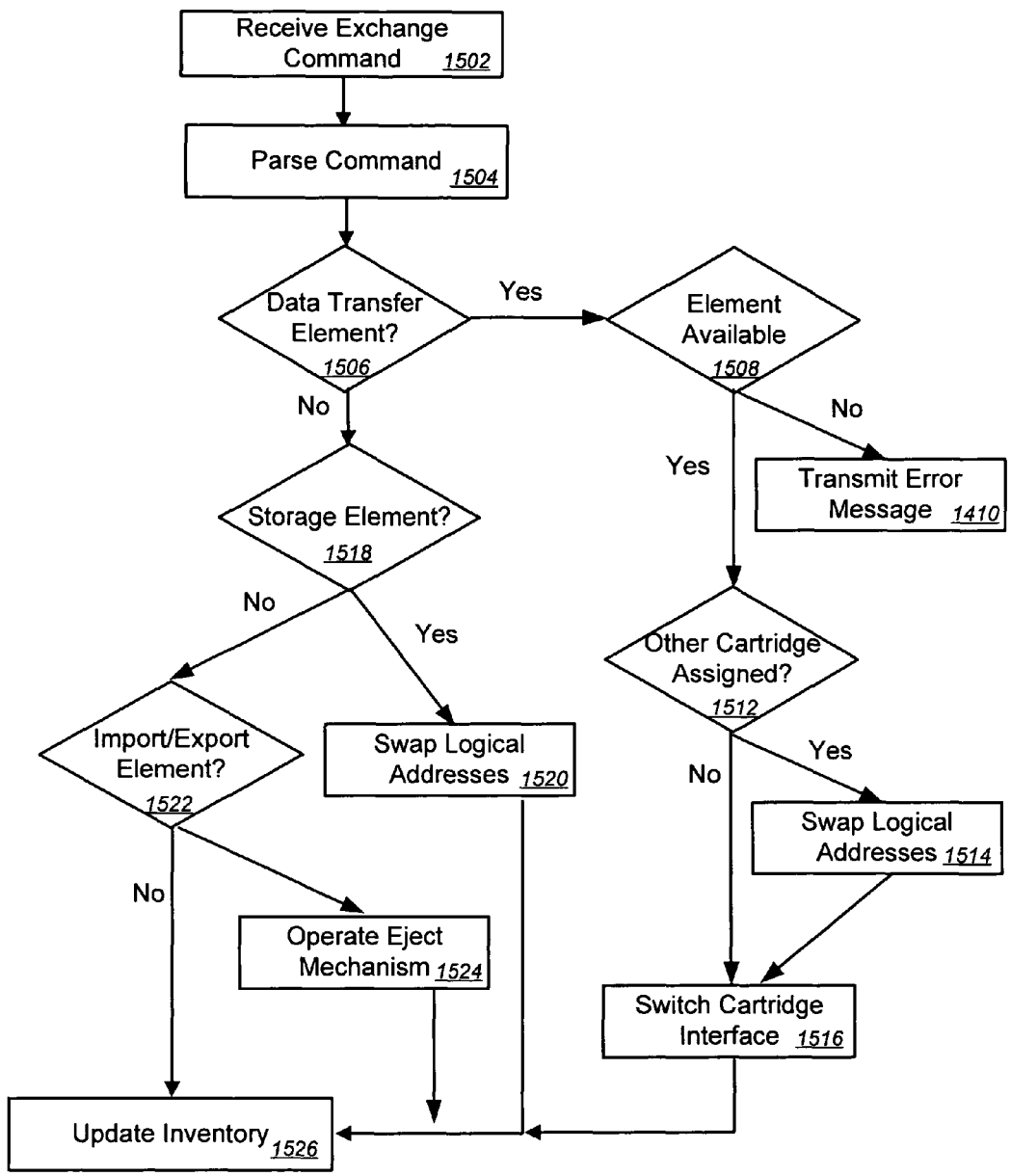
FIG. 15 is a flow diagram illustrating an exemplary method that may be performed by a removable cartridge storage device to process an exchange command.

FIG. 15 is a flow diagram illustrating an exemplary method that may be performed by a removable cartridge storage device to process an exchange command. An exchange command may be a special type of move command where the contents of two elements are swapped. In some aspects, the exchange command may be a command for an automated tape device, such as a SCSI Exchange Medium command or other type of command to swap the contents of elements in an automated tape device. In other embodiments, the command may not be a command executable by an automated tape device.

At block 1502, the exchange command is received. The command is then parsed 1504 to obtain the parameters associated with the command. By way of example, a source element and a destination element may be obtained from the parsing.

The action(s) taken to process the command may depend upon the type of elements involved in the command. If 1506 the exchange command is between a storage element and a data transfer element (virtually represented by an electronic connection between system controller and a cartridge interface), a determination may be made as to whether the data transfer element is available 1508. The data transfer element may not be available if the system controller is busy processing another data transfer operation. Thus, an error message 1410 may be transmitted to the host computer. Other circumstances may also result in a determination 1508 that a data transfer element is not available.

If 1508 the data transfer element is available 1508 and if 1512 there is not another cartridge assigned to the data transfer element, the system controller, or other component of the storage device, may cause the cartridge interface to electronically switch 1516 communications from the system controller to the cartridge holder associated with the second exchange element and the inventory may be updated 1526. Otherwise, if 1508 the data transfer element is available and if 1512 there is another cartridge assigned to the data transfer element, the storage device may swap the logical address associated with the cartridge already assigned to the data transfer element with the logical address of the swapped cartridge. The cartridge interface is also switched 1516 to the cartridge holder to which the swapped cartridge is removably coupled and the inventory is updated 1526. In alternative embodiments, if 1512 there is another cartridge assigned to the data transfer element, an error message may be transmitted to the host computer.

If 1518 the source and destination elements of the exchange command are storage elements (cartridge holders), the storage device may swap 1520 the logical addresses associated with the physical addresses of the cartridge holders. Thus, the logical addresses used by the host computer will correspond to the physical addresses of the cartridge interfaces after the cartridges have been "virtually" swapped. At block 1526, the inventory is updated to reflect the changed logical addresses.

If 1522 the destination address is a virtual import/export mechanism, the exchange command may be processed by operating 1524 an eject mechanism and updating 1526 the inventory to remove the ejected cartridge. In other embodiments, the eject mechanism may not be operated 1524 until an operator presses an eject button associated with the cartridge holder.

In alternative embodiments, variations may be made to the method described in FIG. 15. Merely by way of example, in some embodiments, the removable cartridge storage device may implement a physical cartridge mover and/or a physical import/export mechanism. Thus, the exchange command may be processed using physical movements instead of or in addition to virtual exchanges.

In the foregoing description, for the purposes of illustration, methods were described in a particular order. It should be appreciated that in alternative embodiments, the methods may be performed in a different order than that described. Additionally, the methods may include additional, different, or fewer blocks than described. It should also be appreciated that the methods may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A removable cartridge storage device comprising:
a plurality of cartridge holders, each of the cartridge holders including an electrical connector configured to removably couple with a mating electrical connector of each of a plurality of portable data cartridges, each such portable data cartridge having an electronic interface and at least one of the portable data cartridges including a data set independent of data stored on others of the portable data cartridges;
a system controller configured to process commands transmitted to the removable cartridge storage device, wherein the system controller includes an interface to receive media changer commands and to map the received media changer commands into electronic switching operations; and
a switch, coupled between the cartridge holders and the system controller, to execute the electronic switching operations to electronically switch connections between the system controller and the cartridge holders to make or break a connection between the system controller and the at least one of the portable data cartridges when the electronic interface of the at least one of the portable data cartridges is coupled with the electrical connector of one of the cartridge holders.

2. The removable cartridge storage device of claim 1, wherein the interface is further configured to receive data commands.

3. The removable cartridge storage device of claim 2, wherein the data commands comprise sequential tape device commands and wherein the system controller is further configured to execute the sequential tape device commands.

4. The removable cartridge storage device of claim 2, wherein the data commands comprise disk-drive commands and wherein the system controller is further configured to execute the disk-drive commands.

5. The removable cartridge storage device of claim 2, wherein the data commands comprise optical-disk commands and wherein the system controller is further configured to execute the optical-disk commands.

6. The removable cartridge storage device of claim 1, wherein the interface comprises one of a Small Computer Systems Interface (SCSI) and a Fiber Channel interface.

7. The removable cartridge storage device of claim 1, wherein the media changer commands comprise Small Computer Systems Interface (SCSI) media changer commands.

8. The removable cartridge storage device of claim 1, wherein the media changer commands comprise automated tape device commands.

9. The removable cartridge storage device of claim 1, wherein the media changer commands comprise a move medium command and wherein the system controller is configured to execute an electronic switch command corresponding to the move medium command electronically.

10. The removable cartridge storage device of claim 1, wherein the media changer command comprises an audit command to audit the removable cartridge storage device and wherein the system controller is configured to execute the audit command electronically.

11. The removable cartridge storage device of claim 1, wherein the system controller is further configured to emulate a tape device.

12. The removable cartridge storage device of claim 1, wherein the electrical connectors are each configured to removably couple with portable data cartridges having an embedded hard disk drive (HDD).

13. The removable cartridge storage device of claim 1, wherein the electrical connectors are each configured to removably couple with portable data cartridges having flash memory.

14. The removable cartridge storage device of claim 1, further comprising a Serial Advanced Technology Attachment (SATA) interface, coupled between the system controller and the cartridge holders.

15. The removable cartridge storage device of claim 1, wherein the system controller is further configured to perform copy operations without transferring data to a host computer.

16. The removable cartridge storage device of claim 1, wherein the system controller is configured to write data sequentially.

17. The removable cartridge storage device of claim 1, wherein each of the cartridge holders defines an opening exterior to the removable cartridge storage device to receive portable data cartridges.

18. The removable cartridge storage device of claim 1, wherein the system controller is configured to perform a cartridge inventory electronically by electronically scanning each of the cartridge holders.

19. A method comprising:
receiving, at a storage device, a data command from a host computer system, the data command associated with a first portable data cartridge having an electronic interface, the first portable data cartridge removably coupled with the storage device;
receiving, at the storage device, a media changer command;
mapping the media changer command into an electronic switching operation;
electronically switching communications from a second portable data cartridge removably coupled with the storage device to the first portable data cartridge in accordance with the electronic switching operation, wherein the second portable data cartridge includes a data set independent of data stored on the first portable data cartridge; and
executing the data command.

20. The method of claim 19, wherein receiving the data command comprises receiving a tape command.

21. The method of claim 19, wherein the data command comprises a copy command, and wherein executing the data-command comprises:
reading data from the first portable data cartridge;
electronically switching to a target portable data cartridge removably coupled with the storage device; and
writing the data to the target portable data cartridge without transferring the data to the host computer system.

22. The method of claim 19, wherein the data command comprises a read command or a write command.

23. The method of claim 19, further comprising:
receiving a move media command; and
executing the move media command electronically.

24. The method of claim 23, further comprising:
receiving an audit command; and
auditing the storage device electronically.

* * * * *